Patented Oct. 6, 1936

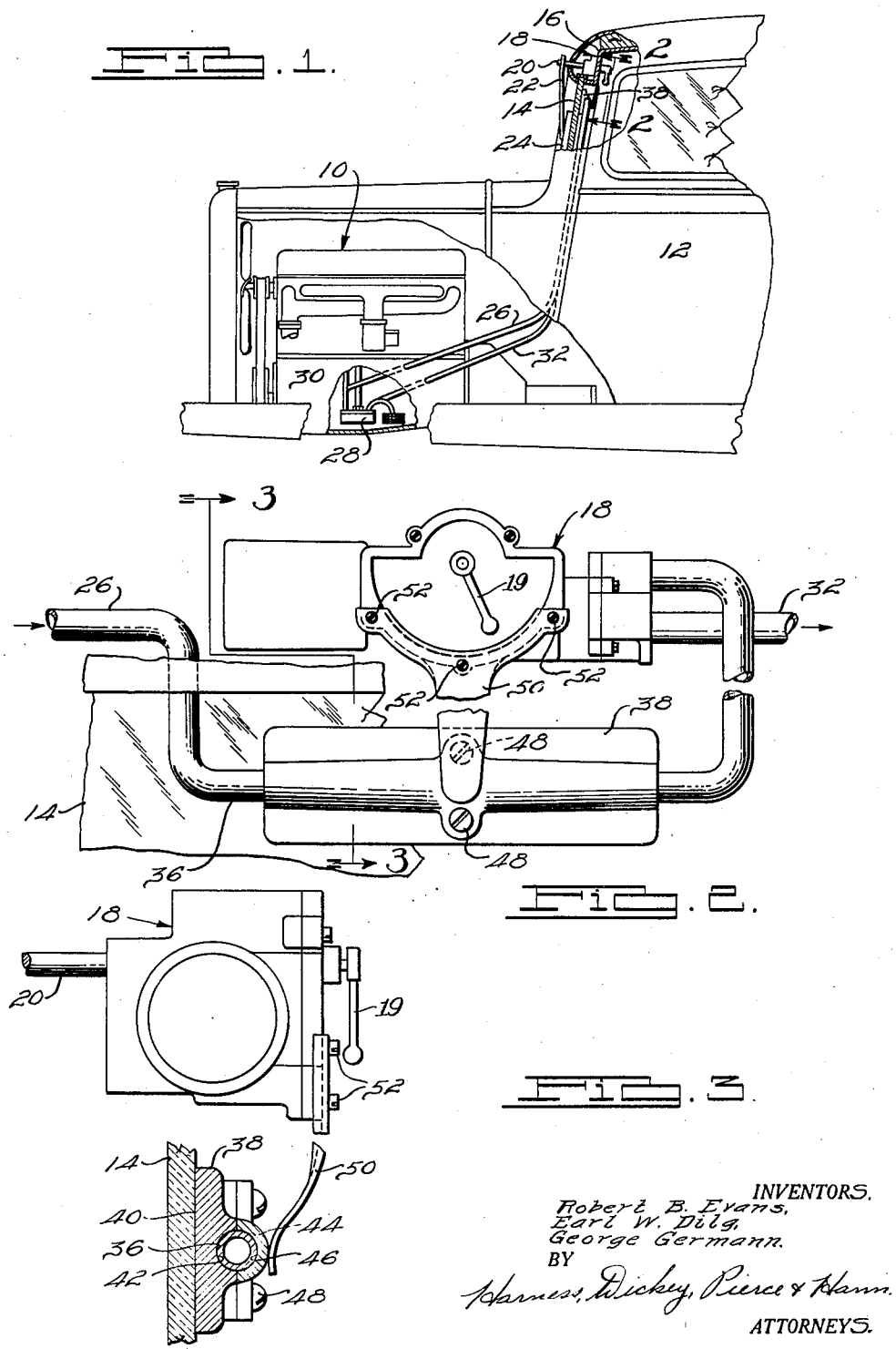

2,056,776

UNITED STATES PATENT OFFICE 2,056,776

WINDSHIELD WARMER

Robert B. Evans, Grosse Pointe, and Earl W. Dilg and George Germann, Detroit, Mich., assignors to E. S. Evans and Sons, Detroit, Mich., a corporation of Michigan Original application August 28, 1933, Serial No. 687,062. Divided and this application April 27, 1934, Serial No. 722,738

10 Claims. (Cl. 20—40.5)

This invention relates generally to motor vehicles and particularly to a construction by means of which one or more areas of the windshield of the vehicle may be artificially heated so as to cause ice or snow deposited upon the affected area of the windshield to be melted, as well as to prevent moisture from freezing or otherwise collecting upon the affected area of the windshield in such form that it will affect the visibility therethrough, and is a division of our application for Letters Patent of the United States for Improvements in windshield wiper, filed Aug. 28, 1933, Serial No. 687,062.

Other objects of the invention include the provision of means for conducting heat to one or more areas of the windshield of a motor vehicle from the lubricating oil of the lubrication system of the internal combustion engine driving the vehicle; the provision of means in heat conducting relation with respect to the windshield of a motor vehicle and means for circulating lubricating oil from the engine therethrough; the provision of a metallic heat conducting member contacting the windshield of a motor vehicle and thermally associated with the lubrication system of the internal combustion engine for the vehicle by means of lubricant circulating ducts; the provision of a heat conducting element as above described character resiliently maintained in heat conducting relation with respect to the windshield; the provision, in combination with a windshield wiper for a motor vehicle obtaining its source of power from the lubrication system of the engine by means of lubricant ducts connected thereto, of means in heat conducting relation with respect to one of said ducts and with the windshield of the vehicle whereby to cause an area of said windshield to be warmed; and the provision of such means so constructed and arranged as to prevent excessive heating of the windshield.

The above being among the objects of the present invention, the same consists in certain novel features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views, Fig. 1 is a more or less diagrammatic, partially broken, partially sectioned, side elevational view of a motor vehicle showing a windshield wiper mounted in the conventional location thereon and connected with the lubrication system of the internal combustion engine power plant for the motor vehicle, a heat conducting element being mounted in heat conducting relation with respect to the connection between the engine and the windshield wiper and in heat conducting relation with respect to a portion of the windshield of the motor vehicle.

Fig. 2 is an enlarged, partially broken, elevational view of the rear face of the windshield wiper and windshield warming attachment shown mounted on the motor vehicle in Fig. 1 and looking from the rear of the vehicle as on the line 2—2 of Fig. 1.

Fig. 3 is a sectional view taken on the line 3—3 of Fig. 2.

Referring particularly to Fig. 1, a motor vehicle of conventional construction is indicated as having the usual internal combustion engine indicated generally as at 10 providing the source of power therefor, and a body 12 having a windshield 14 located in the conventional position and provided at its upper edge with what is commonly termed a windshield header bar 16. A windshield wiper structure indicated generally 18 is suitably mounted upon the header bar 16 and is provided with a forwardly extending shaft 20 to which is secured a wiper arm 22 which in turn carries at its free end a windshield wiper plate 24 which may be of any suitable or conventional construction. The windshield wiper 18 is adapted to be driven by lubricating oil under pressure transmitted thereto from the pressure lubricating system of the engine 10 and for this purpose a tube 26, connected with the discharge side of the oil pump 28 located in a conventional position in the lower portion of the crank case 30 of the engine 10, is suitably connected to the windshield wiper 18 for the purpose of conducting lubricating oil thereto. A second tube 32 connected with the discharge side of the windshield wiper 18 extends therefrom to within the crank case 30 for the purpose of returning oil from the windshield wiper to the crank case. A control handle 19 is provided to control the operativeness of the wiper 18 and consequently, the circulation of lubricant to and from the same. The particular means for accomplishing this is fully described in the previously identified parent patent application.

In the broader aspects of the present invention it is immaterial whether or not the present invention is employed in connection with a windshield wiper or not, and in a narrower aspect of the present invention it makes no difference what the specific construction of the windshield wiper 18 is as long as it is operated by lubricating oil from the engine oiling system, but for the purpose of reference, should it be required, the specific construction and mode of operation of the particular windshield wiper 18 shown in the drawing may be determined by an inspection of our co-pending application previously identified of which the present application is a division. Broadly speaking, all that it is required to understand in connection with the present invention is that lubricating oil from the engine oiling system is circulated through the tubes 26 and 32 through a windshield wiper 18 and that, because of the fact that the lubricating oil in the crank case of an internal combustion engine normally attains a temperature in excess of the boiling point of water during normal operation of the engine, the lubricating oil circulating through the tubes 26 and 32 will be relatively warm or even hot.

The present invention contemplates employing the heat of the oil circulating through the tubes 26 and 32 for the purpose of warming one or more areas of the windshield 14 so as to dissipate any snow, ice, frost or fog that may collect thereon and to prevent the formation of such snow, ice, frost or fog on the windshield area affected once it has been warmed by the means herein provided. While in the broader aspects of the invention this result may be obtained by bringing one of the tubes 26 or 32 into direct contact with or in closely spaced relation to the windshield 14, this is ordinarily not desirable from the standpoint of appearance and for other reasons which will hereinafter be specifically brought out and, accordingly, it is preferable to dispose some object formed of thermally conductive material between the windshield and one of the tubes 26 or 32 to effect the desired result. Also, in view of the fact that the lubricating oil in the inlet tube 26 to the windshield wiper 18 will ordinarily be higher in temperature than the oil in the discharge tube 32, such thermally conductive object is preferably conected to the tube 26 in order that it will more efficiently perform its functions.

Accordingly, the tube 26, as best shown in Fig. 2, is provided with a downwardly offset portion 36 shown located below the windshield wiper 18, adjacent the area of the windshield 14 through which the driver normally watches the road, and positioned below the upper edge of the windshield 14. A pad-like member 38 having a planular forward face 40 of material area, and formed preferably from aluminum or some other metal having a relatively high coefficient of thermal conductivity, is provided with a semi-cylindrical groove 42 in its rear face in which the portion 36 of the tube 26 is closely received so as to provide a maximum area of heat conducting surface between them. A cap member 44 having a semi-cylindrical groove 46 in its forward face fits over the rear portion of the tube section 36 and is drawn into position by clamping screws 48 so as to securely clamp the member 38 to the tube 26. Preferably, the fit between the cap 44 and the member 38 is such as to permit their mating surfaces to contact and thereby aid in increasing the heat conducting relation between the tube 26 and the member 38.

The face 40 of the member 38 is preferably resiliently maintained in contact with the windshield 14. This is accomplished in the construction shown by means of a spring arm 50, one end of which is broadened and secured by screws 52 in fixed relation with respect to the windshield wiper 18 and the free downwardly projecting end of which bears against the cap 44 intermediate its ends and resiliently presses the cap 44 and consequently the member 38 forwardly so as to bring the surface 40 into intimate contact with the rear face of the windshield 14.

From the above it will be apparent that with the construction provided the hot oil from the crank case 30 of the engine 10 is forced up through the tube 26 and then, in the particular case shown, through the windshield wiper 18 which acts to a greater or lesser extent to meter or control the otherwise free flow of lubricant therethrough so as not to materially interfere with the proper functioning of the engine lubricating system, and then returned to the crank case through the tube 32. This hot oil flowing through the tube 26 will heat the member 38 which in turn will heat that portion of the windshield 14 in contact with the face 40 as well as the area immediately surrounding it to such an extent as to prevent ice from forming on the windshield and to melt any ice or any snow that may have collected thereon. As previously stated, in the broader aspects of the present invention it is not necessary that the windshield wiper 18 be employed in connection with the tubes 26 and 32 and/or the member 38 as it will be apparent that the same result as herein described will occur if the upper ends of the tubes 26 and 32 are directly connected together, preferably with the interposition of some means to restrict the otherwise free flow of oil through the tubes so as not to materially interfere with the proper functioning of the engine lubricating system, so as to permit a circulation of oil through them. In view of the simplicity of such a construction, it is not deemed necessary to illustrate the same in the drawing. It may be noted that although the member 38 may become relatively warm in service it will be understood that because of its relatively limited area of contact with the tube 26 as compared to its area of contact with the windshield 14 through the face 40, the heat from the oil in the tube 26 will be distributed over a relatively large area which will thus materially reduce the temperature at the face 40 of the member 38 so as to eliminate possibility of overheating the windshield. Also the temperature of the member 38 will increase gradually from the time the engine 10 begins to operate and, being constantly in thermal relation with respect to windshield 14, the windshield 14 will be increased in temperature so gradually as to substantially eliminate any possibility of the heat from the member 38 causing it to crack. An incidental feature of this construction which, of course, will be apparent to those skilled in the art is that the device herein illustrated will aid to a greater or lesser extent in cooling the lubricating oil flowing through it and thereby will aid in cooling the oil in the engine crank case.

Formal changes may be made in the specific embodiment of the invention described without departing from the spirit and substance of the broad invention, the scope of which is commensurate with the appended claims.

What we claim is:

1. In combination with a motor vehicle having an engine and a pressure lubricating system, a windshield for said vehicle, a heat transmitting member contacting said windshield in heat conducting relation, and means in circulatory connection with said lubricating system for heating said member.

2. In combination with a motor vehicle having an engine provided with a pressure lubricating system and a windshield, a heat transmitting member in thermal association with said windshield, and means for applying the heat of lubricant in said system to said member.

3. In a motor vehicle provided with an engine having a pressure lubricating system and a windshield, a heat transmitting member heated by the lubricant in said system, and means for maintaining said member in contact with said windshield.

4. In combination with a motor vehicle having an internal combustion engine provided with a pressure lubricating system and a windshield, a heat transmitting member thermally associated with said windshield, means for heating said member by the lubricant in said system, and means resiliently pressing said member into contact with said windshield.

5. In combination with a motor vehicle having an internal combustion engine provided with a pressure lubricating system and a windshield, a heat conducting member contacting said windshield, a tube connected with said system and adapted for the circulation of lubricant therethrough and means clamping a portion of said tube in thermal association to said member.

6. In combination with a motor vehicle having an internal combustion engine provided with a pressure lubricating system and a windshield, a windshield wiper mechanism for said windshield, a tube connecting said windshield wiper mechanism with said system for the purpose of transferring lubricant to said mechanism for the purpose of actuating it, and a heat conducting member thermally associated with both said tube and said windshield for the purpose of heating said windshield.

7. In combination with a motor vehicle having a windshield and an engine provided with a lubricating system, a windshield wiper associated with said windshield, a tube connecting said windshield wiper with said lubricating system for motivating said windshield wiper, said tube being in heat conducting relation with respect to said windshield whereby to transfer heat from the lubricant flowing through said tube to said windshield for the purpose of warming it.

8. In combination, a motor vehicle having internal combustion engine equipped with pressure lubricating system and a windshield for said vehicle, a lubricant actuated windshield wiper means having a wiper blade adapted for movement over the surface of said windshield, and tubing connected with said system for conveying lubricant to and from said windshield wiper means, a portion of the length of said tubing formed to occupy a position adjacent the surface of said windshield substantially within the upper portion of the area covered by said wiper blade and being thermally associated with the windshield within said area.

9. In combination, a motor vehicle having internal combustion engine equipped with pressure lubricating system and a windshield for said vehicle, lubricant actuated windshield wiper means, means connected with said system for conveying lubricant to and from said windshield wiper means, a heat transmitting member detachably associated in thermal relation with said lubricant conveying means and said windshield, and means carried by said windshield wiper for maintaining said member in said association with the windshield.

10. In combination, a motor vehicle having an internal combustion engine equipped with a pressure lubricating system and a windshield, a windshield wiper mechanism secured to said vehicle in operative relation to said windshield, a heat conducting member thermally contacting said windshield for the purpose of directly transferring heat thereto, means supported by the wiper mechanism for holding said member in contact with said windshield, and lubricant conducting means connected to said pressure lubricating system and said wiper mechanism for effecting operation of the latter and thermally contacting said heat conducting member to heat the latter.

ROBERT B. EVANS.
E. W. DILG.
GEORGE GERMANN.